United States Patent
Streit et al.

(10) Patent No.: US 9,272,298 B2
(45) Date of Patent: Mar. 1, 2016

(54) OPTIMIZATION OF A DEVICE FOR COATING WORKPIECES

(71) Applicant: Venjakob Maschinenbau GmbH & Co. KG, Rheda-Wiedenbrück (DE)

(72) Inventors: Christian Streit, Rheda-Wiedenbrück (DE); Joachim Voigt, Rheda-Wiedenbrück (DE)

(73) Assignee: Venjakob Maschinenbrau GmbH & KG, Rheda-Wiedenbruck (DE)

( * ) Notice: Subject to any disclaimer, the term of this patent is extended or adjusted under 35 U.S.C. 154(b) by 0 days.

(21) Appl. No.: 14/141,991

(22) Filed: Dec. 27, 2013

(65) Prior Publication Data

US 2014/0205743 A1 Jul. 24, 2014

(30) Foreign Application Priority Data

Jan. 18, 2013 (DE) .......... 10 2013 000 884

(51) Int. Cl.
| | |
|---|---|
| B05C 11/00 | (2006.01) |
| B05B 3/00 | (2006.01) |
| B05B 13/02 | (2006.01) |
| B05B 9/03 | (2006.01) |
| B05B 12/12 | (2006.01) |
| B05B 13/04 | (2006.01) |
| B05B 15/04 | (2006.01) |

(Continued)

(52) U.S. Cl.
CPC ............... *B05B 9/03* (2013.01); *B05B 12/122* (2013.01); *B05B 13/0431* (2013.01); *B05B 13/0447* (2013.01); *B05B 13/0457* (2013.01); *B05B 15/0406* (2013.01); *B05B 13/0478* (2013.01); *B05B 15/1292* (2013.01); *B65G 45/24* (2013.01)

(58) Field of Classification Search
CPC ........................... B05B 13/0457; B65G 45/14
USPC ........... 118/321, 323, 66, 324, 500, 313–315, 118/70, 602; 427/427.1, 427.2, 427.3, 424
See application file for complete search history.

(56) References Cited

U.S. PATENT DOCUMENTS

| | | | | |
|---|---|---|---|---|
| 4,768,462 | A | * | 9/1988 | Kuronaga et al. ............. 118/315 |
| 4,888,200 | A | * | 12/1989 | Milliken ............. B05B 15/0406 |
| | | | | 118/630 |

(Continued)

FOREIGN PATENT DOCUMENTS

| | | |
|---|---|---|
| DE | 3833737 A1 | 4/1990 |
| DE | 10119906 A1 | 10/2002 |

(Continued)

OTHER PUBLICATIONS

Kronert-Schmitt, Walter, "Office Action," German Patent and Trademarks Office, Jun. 11, 2013.

*Primary Examiner* — Yewebdar Tadesse
(74) *Attorney, Agent, or Firm* — Florek & Endres PLLC

(57) ABSTRACT

The invention relates to a device (1) for coating workpieces, comprising a belt conveyor (2) drivable in rotation for transporting workpieces (13) to be coated, at least one paint spraying robot (6) and at least one surface spraying machine (8), wherein the paint spraying robot (6) is set up to coat side surfaces (14) and/or top surfaces (15) of the workpiece (13) and the surface spraying machine (8) is set up to coat the top surfaces (15) and/or side surfaces (14) of the workpiece (13).

13 Claims, 5 Drawing Sheets

Figure 1:
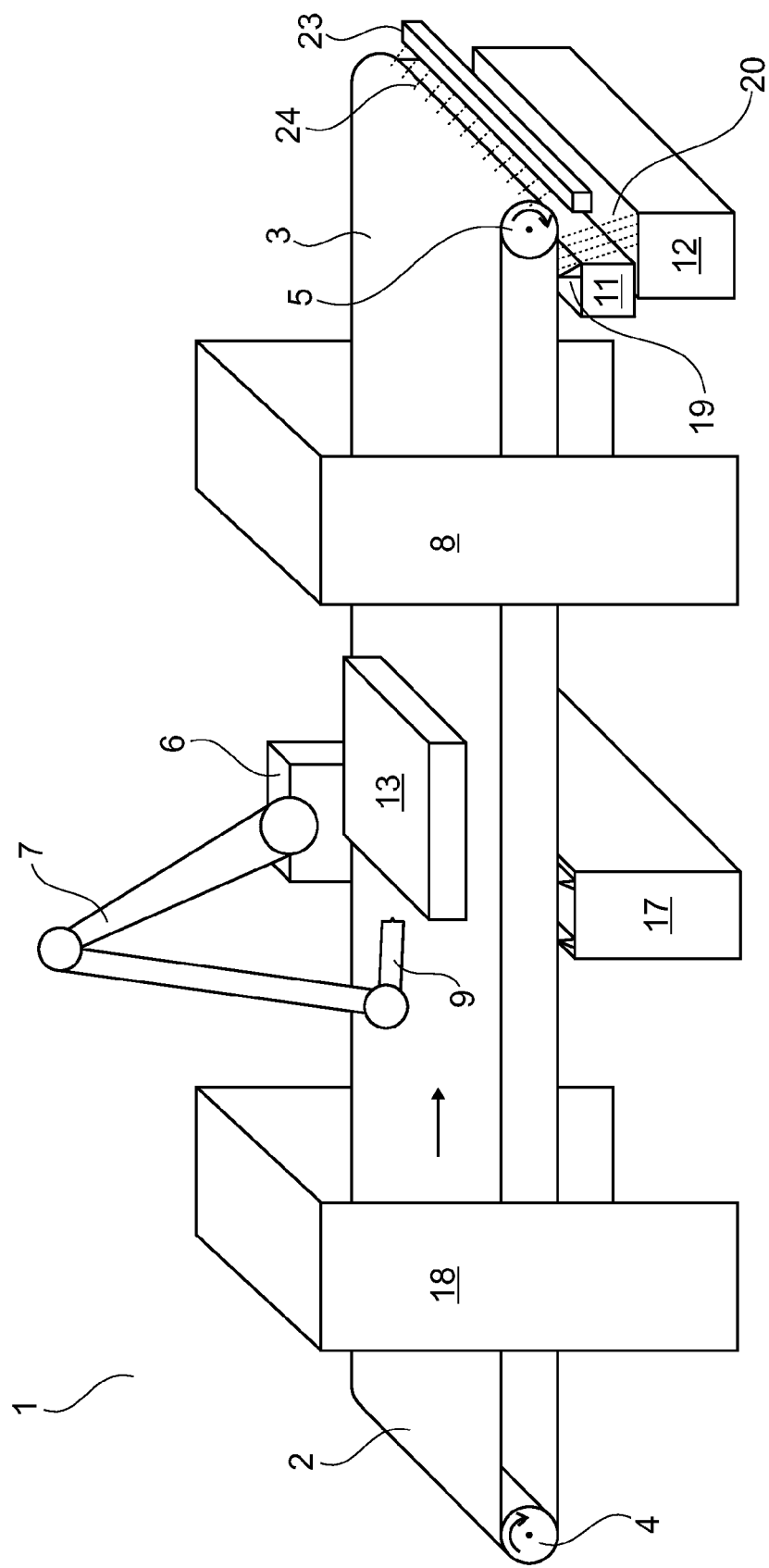

(51) Int. Cl.
*B05B 15/12* (2006.01)
*B65G 45/24* (2006.01)

(56) References Cited

U.S. PATENT DOCUMENTS

| | | | |
|---|---|---|---|
| 4,919,977 A * | 4/1990 | Yamane et al. | 427/379 |
| 4,968,530 A | 11/1990 | Yamane | |
| 5,031,750 A | 7/1991 | Barnes | |
| 5,175,018 A * | 12/1992 | Lee | B05B 13/0431 118/301 |
| 5,645,884 A | 7/1997 | Harlow, Jr. et al. | |
| 5,733,376 A * | 3/1998 | Costello | B05B 13/041 118/220 |
| 6,447,609 B1 * | 9/2002 | Potthoff | B05B 15/0406 118/322 |
| 7,429,298 B2 * | 9/2008 | Krogedal | B05B 13/0452 118/313 |
| 2002/0040678 A1 | 4/2002 | Franzoni et al. | |
| 2004/0028830 A1 | 2/2004 | Bauer | |
| 2009/0204260 A1 * | 8/2009 | Bryne et al. | 700/259 |
| 2009/0320753 A1 * | 12/2009 | Yoshino et al. | 118/315 |

FOREIGN PATENT DOCUMENTS

| | | |
|---|---|---|
| DE | 10239351 A1 | 3/2004 |
| DE | 20 2013 004217 U1 | 5/2013 |
| EP | 0448080 A1 | 9/1991 |
| EP | 1033177 A1 | 9/2000 |
| EP | 2 537 595 A | 12/2012 |
| GB | 2190312 A | 11/1987 |
| JP | 2002225256 A | 8/2002 |
| WO | 0185357 A1 | 11/2001 |

* cited by examiner

OPTIMIZATION OF A DEVICE FOR COATING WORKPIECES

The invention relates to a device for coating workpieces.

The state of the art contains a large number of different possibilities for coating workpieces. Examples of existing coating systems are robot coating systems with floor and overhead conveyor systems, spindle chain conveyors or surface spray coating systems.

A disadvantage of the state of the art is that a virtually loss-free application of paint onto the workpieces cannot be achieved and the degree of efficiency in the recovery of the paint is optimizable.

The object of the present invention is therefore to provide a paint spraying system which overcomes the disadvantages of the state of the art.

Consequently an object of the present invention is to provide a paint spraying system which provides a virtually loss-free application of paint onto the workpieces and makes a reasonable level of paint recovery possible.

This object is achieved by a paint spraying system according to claim 1.

Furthermore this object is achieved by a method according to claim 10.

Further advantageous embodiments of the present invention are given in the dependent claims.

According to a feature of the invention, a device for coating workpieces is provided, comprising a belt conveyor drivable in rotation for transporting workpieces to be coated, at least one paint spraying robot and at least one surface spraying machine, wherein the paint spraying robot is set up to coat the side surfaces and/or top surfaces of the workpiece and the surface spraying machine is set up to coat the top surfaces and/or the side surfaces of the workpiece. This means that the decision of how the coating should be carried out in order to achieve a virtually loss-free application of paint can be made according to the shape of the workpiece to be coated.

In a particularly preferred embodiment of the invention the paint spraying robot is set up to coat only the side surfaces of the workpiece and the surface spraying machine is set up to coat only the top surfaces of the workpiece. Defined surfaces can thus be assigned to the paint spraying robot and the surface spraying machine in order to ensure an improved and virtually loss-free application of paint on the workpiece.

The device for coating workpieces is preferably a paint spraying system or a spray coating system for processing virtually all coating systems such as e.g. 1K and 2K coatings, water-based, solvent-based or UV-curing coatings.

A belt conveyor or paper conveyor (also belt conveyor or band conveyor) is a stationary conveyor system which belongs to the family of continuous conveyors. They have a very high level of operational safety and are reliable transport systems which are economical, highly productive and environmentally-friendly to operate because of their low energy consumption.

Belt conveyors preferably have an endless conveyor belt and at least two tail pulleys. The workpieces can thus be transported on the conveyor belt easily.

The paint spraying robot (edge spraying robot) preferably has a multi-membered arm which has a receiving means for one or more paint spraying guns at one of its ends.

Surface spraying machines are used for applying paint to the surfaces of workpieces, in particular to their top surfaces.

In the case of geometric bodies, such as for example a cuboidal body or a cube, the side surfaces of a workpiece are all surfaces that are not the base or top surface. In the case of cylindrical bodies this is the lateral surface.

In the case of geometric bodies, such as for example a cuboidal body, a cube or a cylindrical body, the top surfaces of a workpiece are the surface which lies opposite and parallel or virtually parallel to the base.

An advantageous development provides for the paint spraying robot to be set up to coat the inner contoured surfaces of the workpiece. It is thus possible to also coat the inner contoured surfaces of a workpiece, which form for example as a result of recesses or cavities in the workpiece, in addition to the side surfaces.

The recesses can be found within the workpiece and the cavities can be provided at the rim or edge area of the workpieces.

Particularly preferably the paint spraying robot has at least one spray gun to effect sufficient application of paint.

By spray gun is preferably meant an apparatus for applying paint to the workpiece.

Several spray guns are preferably used. Using several paint spraying guns means that the guns/their nozzles do not need to be cleaned when the paint is changed, which means that time is saved.

The paint spraying gun can preferably be brought into any place/position in relation to the workpiece with the multi-membered arm of the spraying robot.

A further advantageous development provides for the spray gun to have a nozzle which preferably has a spraying angle/paint discharge angle of from 15° to 65° and particularly preferably of 40°. A defined application of paint to the side surfaces and the inner contoured surfaces of the respective workpiece can thus be achieved.

Particularly preferably the spray gun is arranged movable about several axes.

The receiving means for the spray gun is preferably designed such that the gun is arranged movable about all axes in the receiving means. The spray gun is arranged rotatable about one spraying axis and/or horizontally and/or vertically displaceable.

Particularly preferably the paint spraying robot is movable along at least one additional auxiliary shaft. The provision of the auxiliary shaft is advantageous because the paint spraying robot can be appropriately adapted according to the dimensions of the workpiece and the running speed of the conveyor belt.

In a further advantageous development the surface spraying machine has at least one surface spraying device.

The surface spraying device preferably has a wide spraying angle for applying paint. The spraying angle/paint discharge angle is preferably from 75° to 135° and particularly preferably 90°.

Particularly preferably the surface spraying device is aligned substantially parallel to the upper side of the conveyor belt. The surface spraying device preferably comprises a large number of movable surface spraying nozzles. This makes it possible to apply paint to surfaces for example from above onto the top surface of the workpiece.

Alternatively at least one spray gun can preferably be provided as surface spraying device.

An advantageous development preferably provides that a paint removal apparatus is installed downstream of the belt conveyor.

The paint removal apparatus is preferably arranged below the conveyor belt. The paint removal apparatus preferably has a stripping means to remove/scrape off the paint remaining on the conveyor belt. Stripping means are preferably doctor knives, metal strips or a rotating stripping belt. The stripping belt particularly preferably also has receiving means for cleaning or recovery purposes.

Particularly preferably the paint removal apparatus is arranged rotated by 85 to 95° in the horizontal plane of the belt relative to the belt conveyor (and thus the conveyor belt). This allows the excess paint to be most effectively removed from the conveyor belt by means of the stripping means.

Particularly preferably the excess paint is collected in a paint collection container and can be returned to the paint cycle.

According to a further advantageous development, it is provided that a 3D or 2D part detection device is arranged upstream of the paint spraying system.

Using the 3D or 2D part detection device, it is possible to exactly measure the workpieces to be coated in order to be able to coat them optimally and precisely, without losing a lot of paint, in the subsequent coating process.

Starting from the values/data determined by means of the 3D or 2D part detection device, the paint spraying robot and the surface spraying machine are actuated accordingly to start applying paint. A memory device is preferably provided to store the determined values/data in order to then actuate the paint spraying robot and the surface spraying machine.

An advantageous development provides that the device can be operated in batch operation or in continuous flow operation.

The coating of the workpiece is preferably carried out in batch operation, i.e. the conveyor belt is stationary during the coating process.

Alternatively, the coating of the workpiece is preferably carried out in continuous flow operation, i.e. the conveyor belt, driven by at least one tail pulley, moves at a constant speed and transports the workpiece.

The length of the stripping means preferably corresponds at least to the width of the conveyor belt. It is thereby possible to remove the sprayed-on paint productively from the entire width of the conveyor belt (and later recycle it).

In a preferred alternative embodiment, the length of the stripping means is somewhat smaller than the width of the conveyor belt. This makes it possible to avoid any contact between the stripping means and the edge of the conveyor belt.

In a further particularly preferred embodiment, covered areas are provided on both sides of the conveyor belt which extend along the direction of movement of the conveyor belt. This makes it possible to stop any paint from being applied to the edge areas of the conveyor belt. Consequently, the conveyor belt can also not get soiled in these areas.

A further advantageous development provides for the stripping means to be a doctor knife. A doctor knife is a thin tool which has a sharp or rounded ground edge and preferably consists of a ground steel strip and particularly preferably of plastic such as PVC, PU, polyamide, polyester, PTB or PTFE. The doctor knife serves here to remove excess paint on transport belts (conveyor belts).

According to a further advantageous development, it is provided that the paint spraying system also has at least one moistening apparatus. This makes it possible to wet/moisten the paint on the conveyor belt in order to take it off the conveyor belt more easily. The liquid used as the solvent is preferably based on the processed coating system in order to accelerate the removal process.

A further advantageous development provides that the speed of the conveyor belt is less than or equal to 25 m/min, preferably less than or equal to 4.5 m/min and particularly preferably less than or equal to 2.5 m/min. The slower the speed of the conveyor belt, the more likely it is that any possible wear on the stripping means and on the conveyor belt can be ascertained and a higher level of paint removal can be ensured.

The conveyor belt is particularly preferably constructed to be resistant to solvent and/or antistatic. The conveyor belt particularly preferably consists of plastic or a combination of steel and plastic. Because of the nature of the conveyor belt, the paint to be taken off can be removed particularly easily by means of the paint removal apparatus.

A further advantageous development provides that at least one post-cleaning apparatus is arranged downstream of the paint removal apparatus. This allows the paint that is still adhering to the conveyor belt and was not able to be removed by the paint removal apparatus to still be removed subsequently and returned to the paint collection container as required.

According to a further aspect of the invention, a method is provided which has a paint spraying system according to one of the previous claims, comprising the following steps: detecting the workpiece using the 3D or 2D part detection device, actuating the paint spraying robot, applying the paint to the side surfaces and/or top surfaces and/or the inner contoured surfaces of the workpiece using the paint spraying robot, actuating the surface spraying machine and applying the paint to the top surfaces and/or the side surfaces of the workpiece using the surface spraying machine.

Thus a method is provided in which, starting from the determined measurement data/values of the 3D or 2D part detection device, the paint spraying robot can be actuated accordingly via corresponding technical apparatuses in order to coat the workpieces. The position of the paint spraying robot and its multi-membered arm as well as the paint spraying gun can thus be adjusted precisely to the orientation of the workpiece based on these data/values.

The spraying robot is preferably movable along auxiliary shafts which run parallel to the longitudinal side of the conveyor belt. This allows the paint spraying robot and its multi-membered arm as well as the paint spraying gun to be moved precisely relative to the workpiece.

The paint spraying robot is particularly preferably set up to coat the side surfaces of the workpiece.

Particularly preferably, the surface spraying machine is used to coat the top surface of the workpiece after the side surfaces and the inner contoured surfaces (resulting from cavities or recesses in the workpiece) have been coated.

The surface spraying machine is particularly preferably set up to coat the top surfaces of the workpiece.

The surface spraying machine preferably has a large number of surface spraying nozzles which can be actuated independently of one another according to the determined measurement data/values of the 3D part detection device. The surface spraying device is preferably arranged virtually parallel to the upper surface of the conveyor belt in order in particular to be able to coat the top surfaces of the workpieces.

The surface spraying machine particularly preferably has a means for height adjustment and height rotation which can be adjusted for example mechanically or hydraulically. The surface spraying nozzles can be correspondingly adjusted according to the inclination of the top surface of the workpiece in order to ensure optimal paint application.

Alternatively the surface spraying machine can also be used before the paint spraying robot.

In addition, the method particularly preferably comprises the following steps: removing remaining paint from the conveyor belt using the downstream paint removal apparatus and returning the removed paint to a coating recovery system.

In the coating process, in addition to the workpiece which is actually to be coated, the conveyor belt is also sprayed with paint. In order to be able to remove the paint adhering to the conveyor belt again before it can possibly dry on, the paint is first moistened using the moistening apparatus.

After moistening the paint located on the conveyor belt, the moistened paint is scraped off/removed using the scraping device by means of the paint removal apparatus. The removed paint is then collected in a paint collection container and can be returned to the paint cycle and thus to the paint spraying robot and/or the surface spraying machine.

Figure 2:
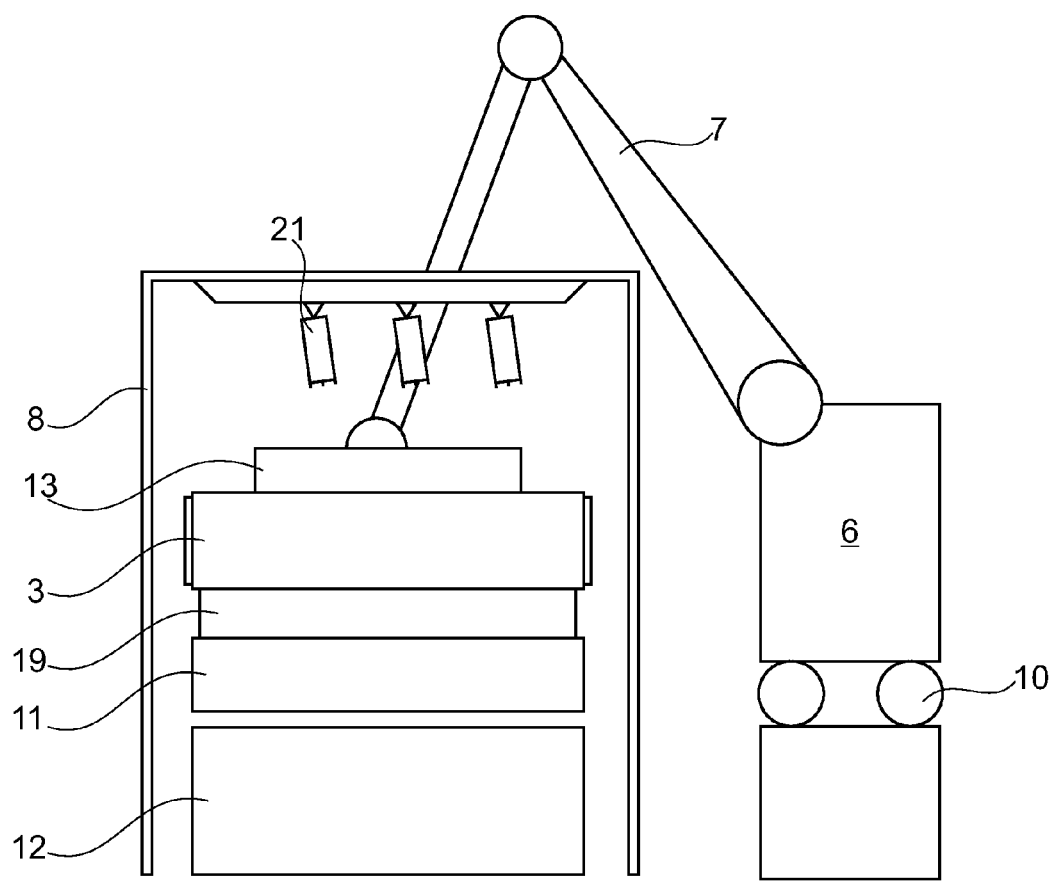
Figure 3:
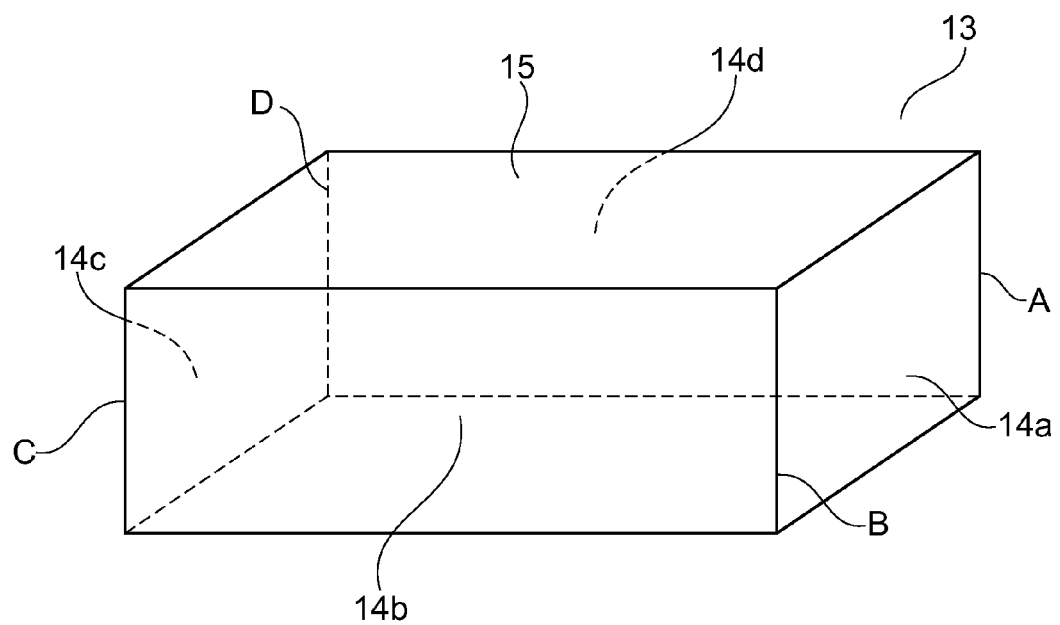
Figure 4:
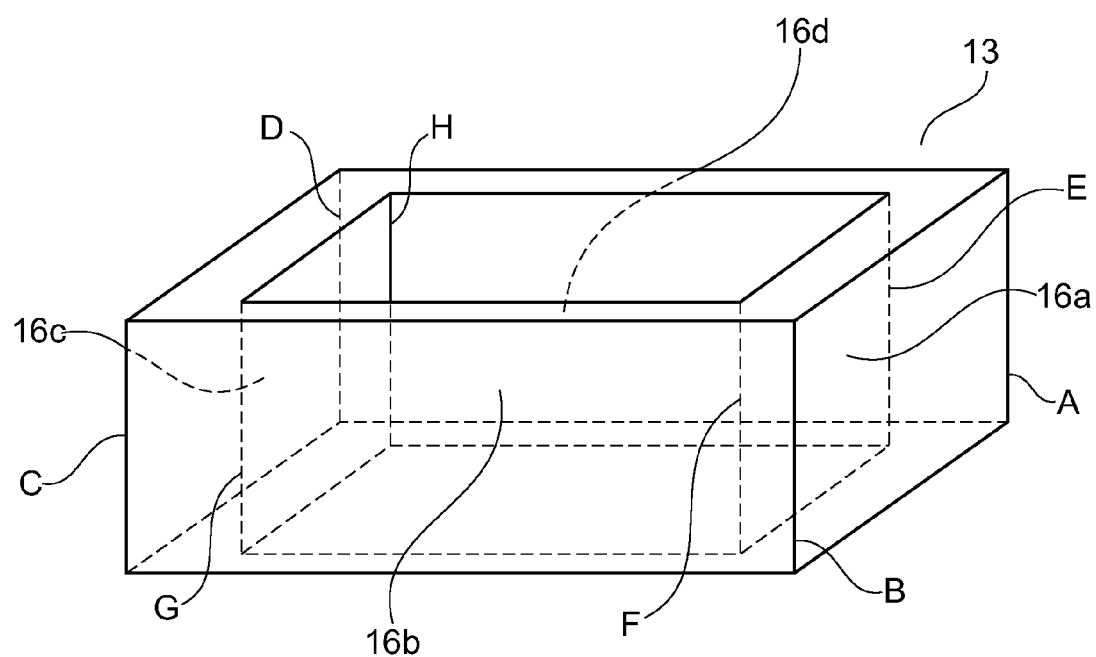
Figure 5:
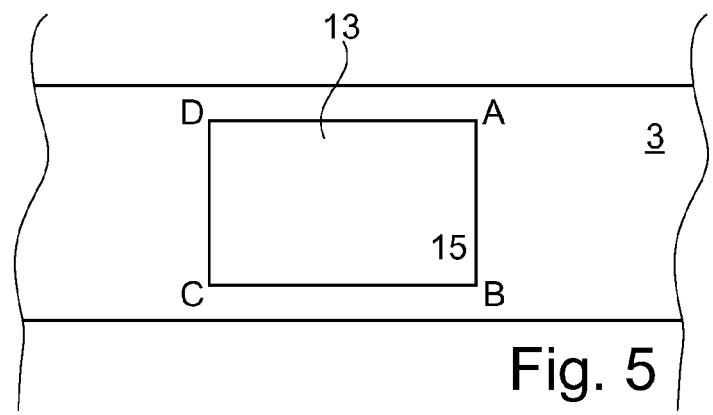
Figure 6:
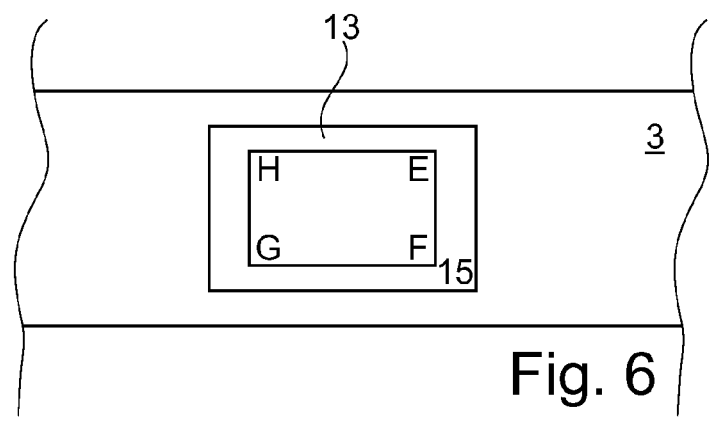
Figure 7:
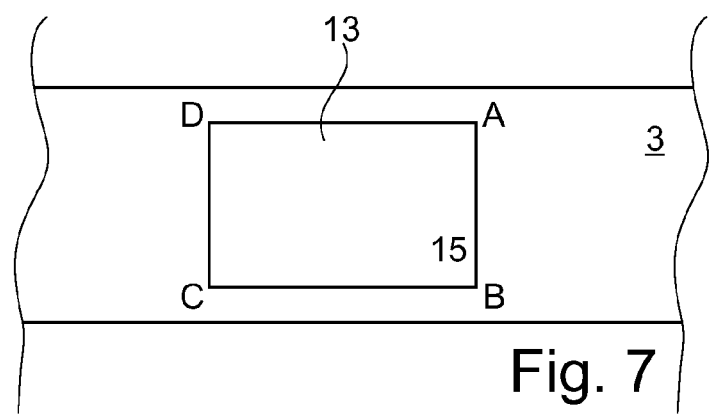

Further advantages and features of the invention are illustrated with the help of the embodiments represented in the figures. The figures show in particular:

FIG. 1 a side view of a device according to the invention for coating workpieces, FIG. 2 a front view of the device according to the invention for coating workpieces from FIG. 1, FIG. 3 a first schematic view of a workpiece from FIG. 1, FIG. 4 a second schematic view of a workpiece with a recess from FIG. 1, FIG. 5 a first top view of a workpiece from FIG. 3 during the coating process with a paint spraying robot of the device according to the invention from FIG. 1, FIG. 6 a second top view of a workpiece from FIG. 4 during the coating process with the paint spraying robot of the device according to the invention from FIG. 1, and FIG. 7 a third top view of a workpiece from FIG. 3 during the coating process with two paint spraying robots of the device according to the invention from FIG. 1.

A side view of a device according to the invention for coating workpieces is represented in FIG. 1. The device 1 for coating workpieces is very simply constructed and consists essentially of the following components: belt conveyor 2, paint spraying robot 6 and surface spraying machine 8 as well as a 3D part detection device 18.

The belt conveyor 2 has a conveyor belt 3, a first tail pulley 4 and a second tail pulley 5. The conveyor belt 3 is driven by means of one of the two tail pulleys 4 and 5. The conveyor belt 3 transports the workpieces which are to be coated from the 3D part detection device 18 to the paint spraying robot 6 and then further to the surface spraying machine 8 (see arrow on the conveyor belt 3). Following the coating process, the fully coated workpieces 13 are taken from the conveyor belt 3.

A paint removal apparatus 11 has a scraping device 19 to remove excess paint from the conveyor belt 3. The paint removal apparatus 11 is arranged below the conveyor belt 3.

A moistening apparatus 23, which is arranged before the paint removal apparatus 11, and a post-cleaning apparatus 17 are also provided.

Using the 3D or 2D part detection device 18, it is possible firstly to exactly measure the workpieces 13 to be coated in order to be able to coat them optimally and precisely, without losing a lot of paint, in the subsequent coating process.

Starting from the determined measurement data/values of the 3D or 2D part detection device 18, the paint spraying robot 6 can be actuated accordingly using appropriate technical apparatuses in order to coat the workpieces 13. The paint spraying gun 9 can also be positioned according to the position of the paint spraying robot 6 or its multi-membered arm 7. The workpiece 13 here has a cuboidal geometry. The total surface to be coated of the cuboid is comprised of the four side surfaces 14a-14 *d* (FIG. 3) and the top surface 15 (FIG. 3) of the workpiece 13.

The spraying robot 3, the multi-membered arm 7 and the spray gun 9 are positioned accordingly to coat the desired side surfaces 14.

The coating process for the side surfaces 14 of the workpiece 13 takes place in continuous flow operation, i.e. the conveyor belt 3, driven by the tail pulleys 4 and 5, moves at a constant speed.

Once the side surfaces 14 have been coated, the surface spraying machine 8 is used. The surface spraying machine 8 has a surface spraying device with surface spraying nozzles 21 (FIG. 2). The surface spraying nozzles 21 can be actuated independently of one another, according to the determined measurement data/values of the 3D part detection device 18. The surface spraying device is arranged virtually parallel to the surface of the conveyor belt 3 in order to coat the top surfaces 15 of the workpieces 13 in continuous flow operation.

Furthermore, the distance between the surface spraying nozzles 21 and the respective top surface 15 to be sprayed of the workpiece 13 can be adjusted by either a mechanical or hydraulic means (not shown).

In the coating process, in addition to the workpiece 13 which is actually to be coated, the conveyor belt 3 is also sprayed with paint. In order to be able to remove the paint adhering to the conveyor belt 3 again before it can possibly dry on, the paint is first moistened using the moistening apparatus 23 (see dotted line 24).

After moistening the paint located on the conveyor belt, the moistened paint is scraped off/removed using the scraping device 19 by means of the paint removal apparatus 11 (see fall line 20 of the paint).

The removed paint is then collected in the paint collection container 12 and can be returned to the paint cycle and thus to the paint spraying robot 6 and/or the surface spraying machine 8.

Paint that cannot be removed is then also taken off the conveyor belt 3 using the post-cleaning apparatus 17 which is arranged after the paint removal apparatus 11.

FIG. 2 shows a front view of the device according to the invention for coating workpieces from FIG. 1.

In addition to the components described in FIG. 1, an auxiliary shaft 10 of the spraying robot 6 and the surface spraying nozzles 21 of the surface spraying machine 8 are represented in FIG. 2. The surface spraying nozzles 21 are set up to move accordingly to and fro over the workpiece 13 while paint is applied.

The auxiliary shafts 10 serve to move the paint spraying robot parallel along the transport direction of the conveyor belt 3, in order to coat the corresponding side surfaces 14 of the workpiece 13.

The length of the stripping means 19 is smaller than the width of the conveyor belt 3. Contact between the stripping means 19 and the edge of the conveyor belt 3 is thus ruled out.

In addition, covers (not shown), which extend along the longitudinal side of the conveyor belt 3, are provided on both sides of the conveyor belt 3. This makes it possible to stop any paint from being applied to the edge areas of the conveyor belt 3. A soiling of the conveyor belt 3 is thus avoided in these areas. The moistening apparatus 23 is not shown for reasons of clarity.

FIG. 3 shows a first schematic view of a workpiece from FIG. 1. The cuboidal workpiece 13 has a base, a top surface 15 and four side surfaces 14a to 14*d* [ . . . ]. The four edges of the workpiece 13 are labelled with the letters A to D below.

The edges A and B border the surface 14a, the edges B and C border the surface 14b, the edges C and D border the surface 14c and the edges D and A border the surface 14d.

All side surfaces 14a-14d are coated down to the base by the paint spraying robot 6, and the top surface 15 is coated by the surface spraying machine 8.

FIG. 4 shows a second schematic view of a workpiece with a recess, from FIG. 1. In contrast to the cuboidal workpiece described under FIG. 3, the workpiece 13 from FIG. 4 also has a recess.

The recess has inner contours 16a to 16d. The edges E and F border the surface 16a, the edges F and G border the surface 16b, the edges G and H border the surface 16c and the edges H and E border the surface 16d.

A first top view of a workpiece from FIG. 3 during the coating process with a paint spraying robot of the device according to the invention from FIG. 1 is shown in FIG. 5.

The top surface 15 of the workpiece 13 (according to FIG. 3) and part of the conveyor belt 3 are represented in the top view from FIG. 5.

The paint spraying robot 6 starts applying paint to the surface of the workpiece 13 at edge A working clockwise over edges B, C, D to edge A to coat side surfaces 14a to 14d of the workpiece 13. It is also possible to apply paint to the surface of the workpiece 13 in a counter-clockwise direction.

The paint spraying robot 6 can be moved accordingly along a longitudinal side of the conveyor belt 3 using auxiliary shafts 10.

FIG. 6 shows a second top view of a workpiece from FIG. 4 during the coating process with the paint spraying robot of the device according to the invention from FIG. 1.

The top surface 15 of the workpiece 13 and part of the conveyor belt 3 are represented in the top view from FIG. 6. The workpiece 13 also has a recess according to FIG. 4.

The paint spraying robot 6 starts applying paint to the surface at edge E working clockwise over edges F, G and H to edge E to coat the inner contoured surfaces of the workpiece 13.

The paint spraying robot 6 can be moved accordingly along a longitudinal side of the conveyor belt 3 using auxiliary shafts 10.

FIG. 7 shows a third top view of a workpiece from FIG. 3 during the coating process with two paint spraying robots of the device according to the invention from FIG. 1.

The top surface 15 of the workpiece 13 and part of the conveyor belt 3 are represented in the top view from FIG. 7.

In addition to edges A, B, C and D, the workpiece also has points I and J.

In contrast to the paint spraying robot 6 described in FIGS. 5 and 6, two paint spraying robots are used in FIG. 7. The paint spraying robots are then located opposite each other on both longitudinal sides of the conveyor belt 3.

The first paint spraying robot starts the coating process in the counter-clockwise direction at edge A, in the direction of edge D as far as edge C, to coat side surfaces 14d and 14c of the workpiece 13.

The second paint spraying robot starts the coating process in the clockwise direction at edge A, in the direction of edge B as far as edge C, to coat side surfaces 14a and 14b of the workpiece 13.

The paint spraying robots can be moved accordingly along the longitudinal sides of the conveyor belt using the auxiliary shafts.

With the device according to the invention for coating workpieces, a compact unit is provided which is also characterized by a simple technical construction, ensures a precise application of paint and furthermore effects an improved paint recovery.

LIST OF REFERENCE NUMBERS

1 Device for coating workpieces
2 Belt conveyor
3 Conveyor belt
4 First tail pulley of the belt conveyor
5 Second tail pulley of the belt conveyor
6 Paint spraying robot
7 Multi-membered arm of the paint spraying robot
8 Surface spraying machine
9 Spray gun
10 Auxiliary shaft
11 Paint removal apparatus
12 Paint collection container
13 Workpiece
14 Side surfaces
15 Top surfaces
16 Inner contoured surfaces
17 Post-cleaning apparatus
18 3D or 2D part detection device
19 Scraping device
20 Fall line of the paint
21 Surface spraying device
22 Recess
23 Moistening apparatus
24 Spraying line of the moistening apparatus
A-H Edges

The invention claimed is:

1. A device for coating workpieces, comprising
a belt conveyor drivable in rotation for transporting workpieces to be coated,
at least one paint spraying robot,
at least one surface spraying machine and
a paint removal apparatus and/or at least one post-cleaning apparatus for cleaning the belt conveyor downstream of each of the at least one paint spraying robot and each of the at least one surface spraying machine,
wherein the at least one paint spraying robot is set up to coat side surfaces and/or top surfaces of the workpiece, and the at least one surface spraying machine is set up to coat the top surfaces and/or side surfaces of the workpiece.

2. The device for coating workpieces according to claim 1, wherein the paint spraying robot is set up to coat inner contoured surfaces in the workpiece.

3. The device for coating workpieces according to claim 1, wherein the paint spraying robot has at least one spray gun.

4. The device for coating workpieces according to claim 3, wherein the spray gun is movable around several axes.

5. The device for coating workpieces according to claim 1, wherein the paint spraying robot is movable along at least one additional auxiliary shaft.

6. The device for coating workpieces according to claim 1, wherein the surface spraying machine has at least one surface spraying device.

7. The device for coating workpieces according to claim 1, wherein the paint removal apparatus and/or the post-cleaning apparatus is arranged downstream of the belt conveyor.

8. The device for coating workpieces according to claim 1, wherein a 3D or 2D part detection device is arranged upstream of the at least one paint spraying robot and the at least one surface spraying machine.

9. The device for coating workpieces according to claim 1, wherein the device can be operated in batch operation or in continuous flow operation.

10. The device for coating workpieces according to claim 1, wherein the paint removal apparatus and/or at least one post-cleaning apparatus is located below the belt conveyer, rotated by 85 to 95° in the horizontal plane of the belt conveyor.

11. The device for coating workpieces according to claim 1, wherein the paint removal apparatus and/or at least one post-cleaning apparatus includes one or more stripping members.

12. The device for coating workpieces according to claim 1, wherein the paint removal apparatus and/or at least one post-cleaning apparatus includes a paint recovery receiver.

13. The device for coating workpieces according to claim 1, wherein the paint removal apparatus and/or at least one post-cleaning apparatus includes at least one moistening apparatus.

* * * * *